(12) United States Patent
Mes et al.

(10) Patent No.: US 12,308,624 B2
(45) Date of Patent: May 20, 2025

(54) COUPLING DEVICE AND METHOD FOR PULLING AN ELECTRICAL WIRE THROUGH A CONDUIT

(71) Applicant: Mes Bros. B.V., Tilburg (NL)

(72) Inventors: Mark Mes, Tilburg (NL); Jeroen Mes, Tilburg (NL)

(73) Assignee: Mes Bros. B.V., Tilburg (NL)

( * ) Notice: Subject to any disclaimer, the term of this patent is extended or adjusted under 35 U.S.C. 154(b) by 221 days.

(21) Appl. No.: 18/016,492

(22) PCT Filed: Aug. 2, 2021

(86) PCT No.: PCT/EP2021/071560
§ 371 (c)(1),
(2) Date: Jan. 17, 2023

(87) PCT Pub. No.: WO2022/029075
PCT Pub. Date: Feb. 10, 2022

(65) Prior Publication Data
US 2023/0291184 A1    Sep. 14, 2023

(30) Foreign Application Priority Data
Aug. 6, 2020   (NL) .................................... 2026228

(51) Int. Cl.
*H02G 1/02* (2006.01)
*H02G 1/08* (2006.01)
*H02G 1/12* (2006.01)

(52) U.S. Cl.
CPC ............. *H02G 1/081* (2013.01); *H02G 1/127* (2013.01)

(58) Field of Classification Search
CPC ............ H02G 1/081; H02G 1/08; H02G 1/06; H02G 1/005
See application file for complete search history.

(56) References Cited

U.S. PATENT DOCUMENTS

| | | | |
|---|---|---|---|
| 4,453,291 A * | 6/1984 | Fidrych ................ | G02B 6/4465 24/122.3 |
| 6,883,782 B2 * | 4/2005 | Ames ..................... | H02G 1/081 254/134.3 R |
| 6,979,776 B1 * | 12/2005 | Zimmermann .......... | H02G 1/06 174/37 |
| 7,478,794 B1 * | 1/2009 | Gohlke ..................... | B66C 1/42 254/134.3 R |

(Continued)

FOREIGN PATENT DOCUMENTS

| | | |
|---|---|---|
| FR | 2 725 845 A1 | 4/1996 |
| FR | 2 835 660 A1 | 8/2003 |
| NL | 1031669 C | 7/2006 |

*Primary Examiner* — Lee D Wilson
(74) *Attorney, Agent, or Firm* — Hoffmann & Baron, LLP

(57) ABSTRACT

A coupling device for coupling an electrical wire to a pull line includes a main body, a connector, a blade and a fixating element. The main body has a longitudinal direction. The connector is for connecting the main body to the pull line. The blade is coupled to the main body. The main body forms a space for receiving the electrical wire. The blade is configured to create a cut in the electrical wire. The fixating element is configured to fixate the blade in the cut. The fixating element is moveable relative to the main body. The main body includes an opening for receiving the fixating element. The opening is at an offset from the blade along the longitudinal direction.

14 Claims, 7 Drawing Sheets

(56) References Cited

U.S. PATENT DOCUMENTS

| | | | |
|---|---|---|---|
| 7,934,697 B2* | 5/2011 | Gohlke | B66C 1/42 254/134.3 R |
| 2004/0041136 A1* | 3/2004 | Ames | B66C 1/42 254/134.3 FT |
| 2004/0115004 A1* | 6/2004 | Serrano | H02G 1/06 405/176 |
| 2005/0242331 A1* | 11/2005 | Ames | B66C 1/42 254/134.3 FT |
| 2009/0070966 A1* | 3/2009 | Gohlke | H02G 1/081 24/136 R |

* cited by examiner

COUPLING DEVICE AND METHOD FOR PULLING AN ELECTRICAL WIRE THROUGH A CONDUIT

CROSS-REFERENCE TO RELATED APPLICATIONS

This application is the National Stage of International Application No. PCT/EP2021/071560, filed Aug. 2, 2021, which claims the benefit of Netherlands Application No. 2026228, filed Aug. 6, 2020, the contents of which is incorporated by reference herein.

FIELD OF THE INVENTION

The invention relates to a coupling device for coupling an electrical wire to a pull line. The invention further relates to pulling the electrical wire through a conduit. In particular, the invention relates to pulling the electrical wire through a conduit in a building, such as a house or an office building, to install an electric circuit in the building.

BACKGROUND OF THE INVENTION

Many buildings are provided with an electric circuit to provide electricity in the building. The electric circuit has several types of outlets. Wall outlets are provided to connect to plugs of all sorts of electrical devices. Outlets are provided to which light fixtures can be connected. Some outlets may be connected to a motor, for example to operate a garage door or a motorized sunscreen. The electric circuit typically has switches to control the electricity to the outlets. For example, a switch may be set in a first position to block electricity to be provided to an outlet or be set in a second position to allow electricity to the outlet.

The electric circuit has electrical wires to connect the outlets and the switches with each other. The electric circuit also has electrical wires to connect with the fuse box of the building. At the fuse box, electricity is provided from outside the building to the building. The fuse box may have several safety features such as fuses or an earth leakage circuit breaker (ELCB).

A building is typically provided with conduits in which the electrical wires are provided. The conduits commonly are plastic tubes that are arranged in walls or in ceilings. The plastic tubes have bends to direct the electrical wire to all the outlets and switches.

When installing the electric circuit in the building, typically first the conduits are provided. The insides of the conduits are accessible via the locations of the outlets and switches or via junction boxes where multiple conduits come together. To install an electrical wire in a conduit, first a fish tape is inserted in a conduit via an outlet location or a switch location or junction box. The fish tape is commonly a metal wire with sufficient stiffness to be pushed through the conduit. The fish tape is long enough such that one end of the fish tape is sticking out one end of the conduit, while the other end of the fish tape is sticking out the other end of the conduit. An electrician connects the electrical wire to one end of the fish tape. The electrician then pulls the fish tape by the other end back through the conduit. By doing so, the fish tape pulls the electrical wire into the conduit. The electrician pulls the fish tape until the end of the electrical wire connected to the fish tape sticks out of the conduit. Because the electrical wire is longer than the conduit, the other end of the electrical wire is still outside the other end of the conduit. Now the electrical wire is sticking out both ends of the conduit. The electrician disconnects the electrical wire from the fish tape and is able to connect the electrical wire to the outlet or switch as desired.

When using the fish tape as described above, the following problem may occur. When pulling the electrical wire through the conduit, there may be a significant resistance between the electrical wire and the conduit. The resistance may be especially large when there are many bends in the conduit or when the conduit is very long. Part of this resistance may be caused by friction between the electrical wire and the conduit while pulling the electrical wire through the conduit. Another part of the resistance may be caused by the weight of the electrical wire that needs to be dragged into and through the conduit. The resistance causes a force on the connection between the electrical wire and the fish tape that tries to pull the electrical wire and the fish tape apart from each other. The electrical wire needs to be firmly connected to the fish tape to prevent the electrical wire from detaching from the fish tape while pulling the fish tape. If the electrical wire detaches while pulling the fish tape, the electrician needs to completely pull out the electrical wire from the conduit, re-insert the fish line and reconnect the electrical wire to the fish tape to start over.

So connecting the electrical wire to the fish tape needs to be done carefully to prevent undesired detaching of the electrical wire. The fish tape is typically provided with a loop or a hook. The electrician will typically strip a layer of insulation from an end of the electrical wire, so the metal core of the electrical wire is exposed. The electrician then folds and twists the end of the electrical wire around the loop or hook of the fish tape. Then, the electrician will pull the fish tape through the conduit, while another electrician feeds the electrical wire from the other end of the conduit. Although this way of working helps to prevent the electrical wire from detaching from the fish tape, it is very labor intensive. Two electricians are needed to install the electrical wire. Also, when one electrician is removing the insulation from the end of the electrical wire and is connecting the electrical wire to the fish tape, the other electrician is waiting.

To improve the speed with which an electrician can connect the electrical wire to the fish tape, coupling devices are known, such as the coupling device as described in US patent application number US2005/0242331A1. The known coupling device couples the electrical wire with the fish tape. The known coupling device has a tubular body in which one end of the electrical wire can be received. Inside the tubular body, a plurality of teeth are provided. The teeth are rotatably connected to the tubular body, such that the edges of the teeth move along with the electrical wire when the electrical wire is inserted into the tubular body. When pulling the electrical wire in the opposite direction, i.e., trying to pull the electrical wire out the tubular body, friction between the edges of the teeth and the electrical wire cause the teeth rotate such that they push the edges radially inward towards the electrical wire. This increases the friction between the electrical wire and the teeth. The friction provides the force to hold the electrical wire inside the tubular body while pulling the electrical wire through the conduit.

A disadvantage of the known coupling device is that the force that the teeth apply to the electrical wire is still limited. Also, the construction of the known coupling device is complex because of the plurality of movable teeth. Further, because the teeth are arranged radially outward of the electrical wire, the known coupling device may become too large to fit in small diameter conduits, especially when trying to pull multiple electrical wires through the conduit.

A coupling device is known from US2009/0070966A1. The known coupling device is for releasably gripping an elongated item and used in pulling the item through a space. Another coupling device is known from NL1031669. The known coupling device is for providing an aid to pull an electrical wire through a PVC conduit with a pull line. Another coupling device is known from FR2725845. The known coupling device provides a draw cable for introduction of a cable into a sheath or a conduit. Yet another coupling device is known from FR2835660. The known coupling device has a screw to clamp an electrical wire in a housing. The housing is then pulled through a conduit.

SUMMARY OF THE INVENTION

A goal of the invention is to provide an improved coupling device that solves at least one of the problems mentioned above, or at least provides an alternative coupling device.

The goal of the invention is achieved by a coupling device for coupling a plurality of electrical wires to a pull line. The coupling device comprises a main body, a connector, at least one blade and a fixating element. The connector is for connecting the main body to the pull line. The at least one blade is coupled to the main body. The main body forms a first space and a second space. The first space is configured to receive a first electrical wire. The second space is configured to receive a second electrical wire. One of the at least one blade is moveable through the first space to create a cut in the first electrical wire. One of the at least one blade is movable through the second space to create a cut in the second electrical wire. The fixating element is configured to fixate the blade in the cuts. Optionally, the at least one blade is a single blade that is moveable through both the first space and second space to cut in both of the first electrical wire and the second electrical wire. In another option, the at least one blade has two blades. One blade is movable through the first space to cut into the first electrical wire, whereas the other blade is movable through the second space to cut into the second electrical wire.

When pulling the electrical wire through the conduit, the friction between the electrical wire and the conduit creates a force that tries to pull the electrical wire out of the space. However, by fixating the at least one blade in the cuts in the electrical wires the blade is maintained in the electric wires, even when a large pulling force is applied to the coupling device. Preferably, the blade cuts into a metal core of the electric wires. The fixating element fixates the at least one blade in the cut in the metal core. Because of the high tensile strength of the metal core, an even higher reaction force can be applied by the blade on the metal core, without breaking the metal core or without deforming the metal core to the extent that the metal core is pulled from the blade. The fixating element prevents the blade from moving out of the cuts. So the coupling device is able to hold the electrical wire with a large force, which helps to prevent the electrical wire from detaching from the pull line while pulling the electrical wire through the conduit, even when the conduit has many bends and even when there is no electrician feeding the electrical wire into the conduit. As a result, a single electrician is able to install an electrical wire faster than using the known folding method with a reduced risk of the electrical wire detaching from the fish tape.

The electrical wire may be any type of wire that is suitable to conduct electricity. The electrical wire is for example a wire that is configured to provide electric power at about 120 V or about 230 V, such as used in domestic appliances. The electrical wire is for example a wire that is configured to provide electric power at about 400 V or more, such as used in industrial appliances. The electrical wire is for example a wire that is configured to provide an electric data signal. The electric data signal is for example generated by a sensor, such as a temperature sensor or a light sensor, or a control unit. The electric data signal is for example received by a control unit or by a motor.

The pull line is for example a fish tape. A fish tape is a tool that the electrician uses to route the electrical wire through the conduit. The fish tape is an elongated strip, typically made of steel. The fish tape is typically stored on a reel, which gives the fish tape a natural curvature. The electrician uses the natural curvature to guide the fish tape through the conduit by pushing the fish tape and by rotating the fish tape along is longitudinal axis. This helps the fish tape to be pushed along bends. Instead of a fish tape, another type of pull line may be used. For example, the pull line is an old electrical wire that is already present in the conduit and that needs replacement. By attaching one end of the old electrical wire to the coupling device and by pulling the other end of the old electrical wire out of the conduit, the old electrical wire is used as a pull line. In another example, the pull line is a string. The string is for example first coupled to a conduit piston. A conduit piston is a cylindrically shaped body made of a flexible material, such as plastic foam. The conduit piston is pushed into one end of the conduit. At the other end of the conduit, a vacuum is applied, for example by connecting the hose of a vacuum cleaner to that end of the conduit. The vacuum pulls the conduit piston through the conduit to the other end. The conduit piston takes along one end of the string. At the other end of the conduit, the conduit piston is taken out of the conduit and the conduit piston is removed from the string. The string is then connected to the coupling device to pull the electrical wire through the conduit.

The electrical wire has the metal core. The metal core comprises for example copper or a copper alloy. The metal core comprises for example gold and/or silver. The metal core is for example a solid body of metal.

The electrical wire forms, for example, part of a cable that comprises multiple electrical wires. Each of the electrical wires has a metal core that is insulated from the other metal cores. Because of their larger outer circumference, it is typically easier to pull a cable through a conduit than an electrical wire. The large circumference of a cable offers a large surface to hold or clamp the cable by known devices to pull the cable through the conduit. An electrical wire only has a small outer circumference, that offers only a small surface to hold or clamp the electrical wire to pull the electrical wire through the conduit. In an example, if a cable is to be pulled through a conduit, the outer layer of the cable is removed from one end of the cable to expose the individual electrical wires. The coupling device is then coupled to one or more of the individual electrical wires.

The main body is for example a cylindrically shaped body or a cylindrically shaped shell. The main body is for example made from plastic. The outer dimensions of the main body need to be small enough to fit through the conduit. Preferably, the outer dimensions, such as the diameter and the length of the main body, are small enough to fit through the bends of the conduit. The outer edges of the main body are for example rounded to improve the movement of the coupling device through bends in the conduit.

The connector is a suitable connector to connect the main body to the pull line. One end of the pull line is typically provided with a hook or a loop or multiple loops. Commonly, the hook or loop is used to wrap the end of the electrical wire around. The connector is for example configured to connect with the hook or the loop of the fish tape. In another example, the connector is configured to connect with a further coupler. The further coupler is then connected to the fish tape. The further coupler comprises for example a snap ring, or a metal wire loop or a clamping device to connect to the pull line. In an example the connector comprises a clamping device to connect to the pull line. The clamping device comprises, for example, a bolt to clamp the pull line to the main body.

The blade has a cutting edge to cut into the electrical wire. Preferably, the blade is made of a material that has a higher yield strength or a higher hardness than the metal core of the electrical wire. For example, the blade is made of steel. In an embodiment, the coupling device is adapted to be used only once, so the blade only needs to cut the metal core once. In this embodiment, the blade can be made from a material that has a limited yield strength or a limited hardness. The limited yield strength or the limited hardness are for example, the same or marginally larger than the yield strength or the hardness of the metal core. In another example, the yield strength and/or the hardness of the blade is more than twice as much as the yield strength and/or the hardness of the metal core. In case the coupling device is useable only once, the electrical wire is cut off adjacent to the coupling device after the electrical wire has been pulled through the conduit. The length of electrical wire that is cut off does not need to be much more than the length of the space, for example, less than 5 cm. This way, far less electrical wire is wasted compared to winding the electrical wire around a hook of a fish tape, which would waste up to 30 cm of electrical wire.

The shape of the cutting edge of the blade is for example a straight edge. A straight edge is relatively easy to produce. In another example, the cutting edge of the blade is concave, i.e., the outer parts of the cutting edge extend more into the space than the center part of the cutting edge. A concave cutting edge has the advantage that it helps centering the electrical wire relative to the blade. The situation may occur that the electrical wire is initially placed in the space off-center relative to the blade. While moving the blade and the electrical wire relative to each other through the space to cut into the electrical wire, one of the outer parts of the cutting edge will contact the electrical wire first. Because the outer part of the cutting edge is curved, the outer part will apply a force on the electrical wire to push the electrical wire in a direction perpendicular to the longitudinal direction of the electrical wire. That force causes the electrical wire to move to a more centered position relative to the blade. A centered position of the electrical wire allows the blade to properly cut into the metal core. Another benefit of a concave cutting edge is that the concave cutting edge is able to create a large cut along the metal core, without cutting as deep into the metal core as, for example, a straight cutting edge to achieve the same large cut. A concave cutting edge creates the cut in the electrical wire along more along the outer surface of the metal core than a straight cutting edge. By cutting along the outer surface of the metal core, the metal core retains more tensile strength and thus can withstand more pulling force when pulling the electrical wire through the conduit. The concave cutting edge is for example a smooth curved cutting edge. In another example, the concave cutting edge is formed by two or more straight cutting edges at an angle relative to each other. Two straight cutting edges for, for example, a triangular cutting edge.

The at least one blade is coupled to the main body to transfer the pulling force from the pulling line, via the connector and the main body to the electrical wire. For example, the blade is arranged in a slit in the main body. The blade is able to move further into the slit to move through the space to cut into the metal core. The sides of the slit constrain the blade to prevent movement of the blade in other directions and to transfer the pulling force form the main body to the blade. In an example, the main body has a cylindrical shape provided with a radial slit extending from an outer surface of the cylindrical shape to the space. The radial slit is configured to receive the blade. The blade is moveable through the radial slit. In yet another embodiment, the blade is arranged at an acute angle with a longitudinal direction of the electrical wire in the space. The blade is arranged at the acute angle to create a funnel in the space to allow the electrical wire to be inserted in the space. While inserting the electrical wire into the space, the blade does not yet cut into the electrical wire. However, when pulling the electrical wire when the electrical wire is inside the space, the acute angle of the blade causes the blade to cut into the metal core. After pulling the electrical wire, and thus after cutting with the blade into the metal core, the fixating element is placed to fixate the blade in the cut. For example, the fixating element prevents the blade from moving perpendicular to the cutting direction of the blade.

The first space and the second space formed by the main body is sufficiently large to each receive an end of an electrical wire. However, to limit the size of the main body, the space is preferably as small as possible but large enough to allow an electrical wire to be placed in each space easily. The space is for example cylindrically shaped. The diameter of the cylindrically shape is larger than the diameter of the electrical wire. The length of the space is large enough to ensure the end of the electrical wire passes beyond the cutting edge of the blade while inserting the electrical wire into the space, the electrical wire is in the movement path of the blade. The length of the space is in a longitudinal direction. The space has at least one opening through which the electrical wire can be inserted into the space. When the electrical wire is arranged in the space, the longitudinal direction of the space is, for example, parallel with the longitudinal direction of the electrical wire, for example parallel with the longitudinal direction of the portion of the electrical wire in the space. The space has for example, additional openings. An additional opening is for example arranged to visually inspect whether the electrical wire is inserted far enough in the space. Additional openings are for example arranged to reduce the amount of material used for the main body. The first space and the second space are separated from each other such that an electrical wire is not able to move from the first space directly to the second space or vice versa. For example, the first and second spaces are separated from each other by an inner wall of the main body. This way, the first space properly arranges the first electrical wire relative to the blade, and the second space properly arranges the second electrical wire relative to the blade.

The fixating element fixates the blade in the cut while pulling the electrical wire via the pull line. In case the electrical wire gets stuck in the conduit, the electrical engineer may pull the electrical wire back and forth to loosen the electrical wire in the conduit. The fixating element is, adapted to fixate the blade in the cut, even when the electrical engineer pulls the electrical wire back and forth.

To properly couple the electrical wire to the coupling device, the blade creates a cut with a depth perpendicular to the longitudinal direction of the electrical wire of for example, more than 10% of the thickness of the metal core, or more than 20% of the thickness of the metal core, more than 30% of the thickness of the metal core, but for example less than 60% of the thickness of the metal core or less than 50% of the thickness of the metal core. The depth of the cut should be large enough to hold the blade in the cut when the electrical wire is pulled through the conduit. The depth of the cut should not be so large that excessive plastic deformation, such as contraction of the cross-section, of the electrical wire occurs when the electrical wire is pulled through the conduit. The fixating element is configured to fix the blade in the cut. When the blade has cut into the electrical wire, the blade remains in that position to hold the electrical wire in the space. Movement of the blade relative to the main body would pose the risk that the electrical wire would be pulled out of the space while the electrical wire is being pulled through the conduit. By providing the fixating element, undesired movement of the blade is prevented. For example, the fixating element is connected to the blade. The fixating element for example comprises a serrated surface. The main body comprises an opening to receive the fixating element. The serrated surface is arranged to be in contact with a side wall of the opening. The serrated surface is orientated to slide along the side wall when moving the blade in a cutting direction. The serrated surface prevents movement of the blade opposite to the cutting direction. The serrated surface has, for example, a tooth-like projection. When moving the blade in the cutting direction, the leading side of the tooth-like projection is at an obtuse angle with the movement path of the blade, whereas an opposite side, i.e., the receding side, of the tooth-like projection is perpendicular with the movement path of the blade. The leading side allows the serrated surface to slide along the side wall of the opening when moving in the cutting direction. The receding side prevents the serrated surface to move opposite to the cutting direction, because the receding side would then cut into the side wall of the opening, stopping the movement opposite to the cutting direction. The serrated surface has, for example, multiple tooth-like projections. In an example, the fixating element has a narrow fit with the opening. An electrician may use, for example, pliers to press the fixating element into the opening. In another example, the fixating element is attached to the blade. The fixating element has the serrated surface. The fixating element is configured to be press-fitted into the opening in the main body. In an example, the fixating element is separate from the main body and the blade. For example, the fixating element comprises a clamp or a bolt to fix the blade to the main body. The fixating element uses, for example, glue or any other adhesive to fix the blade to the main body. The fixating element comprises, for example, a body that is configured to be placed around at least a part of the main body. In this example, the blade extends out of the main body prior to cutting into the metal core. When the blade is in the cut, the blade does not extend out of the main body. By providing the fixating element around the main body, the fixating element prevents the blade from extending back out of the main body and thus prevents the blade to leave the cut. In an example, the fixating element is placed after the blade has cut into the electrical wire, wherein the fixating element prevents the blade from moving or bending in a direction perpendicular to the cutting direction. The fixating element is for example arranged to confine movement of at least part of the blade in a direction perpendicular to the cutting direction. By confining movement at least part of the blade in a direction perpendicular to the cutting direction, moving or bending of the blade in the direction perpendicular to the cutting direction would cause the blade to come into contact with the fixating element. The fixating element is configured to provide enough force to prevent further moving or bending of the blade in the direction perpendicular to the cutting direction.

In an example the electrical wire comprises the metal core and an insulation layer covering the metal core. The blade is configured to cut through the insulation layer into the metal core.

Most electrical wires have a metal core that is covered with an insulation layer. The metal core is for conducting an electrical current. The insulation layer ensures the electrical current remains insulated from the environment. If the electrical current would flow into the environment, dangerous situations could occur. The insulation layer is typically of a plastic material. The plastic material does not have a large yield strength and will easily tear if a tensile force is applied to the plastic material, especially if there is a cut present in the plastic material. The insulation layer is thus not very well suited to apply the pulling force to when pulling the electrical wire through the conduit. By configuring the blade to cut through the insulation layer, the blade is able to reach the metal core that is very well suited to apply the pulling force to when pulling the electrical wire through the conduit. The electrician does not need to remove the insulation layer from the end of the electrical wire, but can simply insert the end of the electrical wire into the space. This way, the electrician can couple the electrical wire to the coupling device more quickly. The blade is for example provided with enough length to cut through the insulation layer to reach the metal core. In another example, the movement path of the blade is configured to move the cutting edge of the blade through the insulation layer into the metal core.

In an embodiment, the at least one blade is movable coupled to the main body. The at least one blade is configured to create the cuts by moving through the first space and the second space.

In this embodiment, the blade makes the cuts in the electrical wires by moving through the first space and the second space. An advantage of moving the blade through the space is that the depth of the cut in the electrical wire can be controlled by controlling the movement of the blade. Completing the movement of the blade ensures the blade has cut to the desired depth into the metal core. For example, the side of the blade opposite to the cutting edge of the blade is pressed to move the blade. Pressing the blade is for example done by hand or by using pliers. The desired position of the blade is reached, for example, when the side of the blade opposite to the cutting edge is at a certain position, such as, when that side no longer sticks out of the main body. In another example, the desired position of the blade is reached when a part near the cutting edge contacts the main body, preventing the blade from moving further. The blade may be configured move through the space at any desired angle relative to the longitudinal direction of the electrical wire in the space, for example, at an acute angle, at an obtuse angle or at a right angle, i.e., perpendicular to the longitudinal direction of the electrical wire in the space.

In an embodiment, the cutting direction is perpendicular to a longitudinal direction of the first space.

When the electrical wire is in the space, the blade moves in the cutting direction through the first space to cut into the first electrical wire. The blade moves in the cutting direction to cut perpendicular to the longitudinal direction of the first space, which, for example, is parallel to the longitudinal direction of the electrical wire. The blade moves in the cutting direction along a movement path. The movement path of the blade is for example a straight path perpendicular to the longitudinal direction of the first space. In another example, the movement path of the blade is a circular path that is arranged such that the last part of the circular path is perpendicular to the longitudinal direction of the first space. The movement path is for example a rotation along the longitudinal direction of the electrical wire, wherein the rotational axis of the movement path is at an offset from the electrical wire. The movement path of the blade is any suitable movement path that causes the blade to cut into the electrical wire perpendicular to the longitudinal direction of the electrical wire.

Because the blade cuts into the electrical wire perpendicular to the longitudinal direction of the electrical wire, the cutting edge of the blade is directed perpendicular to the longitudinal direction when the blade is in the metal core. When pulling the electrical wire through the conduit, the blade will transfer the pulling force to the metal core in the longitudinal direction. The pulling force is thus perpendicular to the cutting edge of the blade. Because the pulling force is perpendicular to the cutting edge, the pulling force does not cause the blade to cut any further into the metal core. This allows the cut in the electrical wire to remain at the desired depth and thus allows a large pulling force to be applied during the whole process of pulling the electrical wire through the conduit. For example, in this context perpendicular may mean that the blade is configured to cut into the electrical wire at an angle with the longitudinal direction of the electrical wire in the range of 80-100°, for example in the range of 85-95°, for example 88-92°, for example 89-91°. If, on the contrary, the blade would cut into the electrical wire at an angle that is substantially lower than 90°, for example less than 45°, the pulling force could cause the blade to cut further into the electrical wire. As a result, the blade could cut off the electrical wire while pulling the electrical wire through the conduit.

In an embodiment, the first space is configured to arrange a longitudinal direction of the first electrical wire parallel to the longitudinal direction of the first space.

In this embodiment, the first space is configured to arrange the longitudinal direction of the electrical wire parallel with the longitudinal direction of the first space. By aligning the first electrical wire with the first space, the first electrical wire is in the proper orientation relative to the blade. The blade is for example arranged to properly cut into the metal core when the first electrical wire is in the proper orientation relative to the blade. The blade is for example arranged to move through the first space towards the electrical wire to cut perpendicular to the longitudinal direction of the first space. So when the longitudinal direction of the first electrical wire is parallel with the longitudinal direction of the first space, the blade is able to cut into the metal core perpendicular to the longitudinal direction of the first electrical wire. The shape of the first space is for example adapted to arrange the longitudinal direction of the first electrical wire parallel to the longitudinal direction of the first space. For example, the first space is cylindrically shaped with a diameter that is only marginally larger than the diameter of the first electrical wire. The length of the cylindrically shaped space is for example longer than the size of the diameter. For example, the length of the first space is two times or five times or ten times or more than ten times the size of the diameter of the first space. In another example, the first space comprises a slot, wherein the slot has a longitudinal direction. The slot is arranged to receive the electrical wire. When the first electrical wire is inserted in the slot, the longitudinal direction of the first electrical wire is arranged parallel to the longitudinal direction of the slot.

In an embodiment, the at least one blade is moveably coupled to the main body. The at least one blade is configured to move from a first position to a second position. In the first position, the at least one blade is arranged outside the first space to allow the first space to receive the first electrical wire. In the first position, the at least one blade is arranged outside the second space to allow the second space to receive the second electrical wire. In the second position, the fixating element is arranged to fixate the blade in the cuts to hold the first electrical wire in the first space and the second electrical wire in the second space.

In this embodiment, the at least one blade is able to move from the first position to the second position. When the at least one blade is in the second position, the blade has cut into the metal core. The at least one blade holds the electrical wires in the first and second spaces, by remaining in the cuts. The fixating elements holds the blade in the cuts, so the blade is not able to leave the cuts. The cuts forms a handle with which the blade holds the metal cores. The electrical wires are not able to leave the spaces, because the electrical wires are confined between the blade and a sidewall of the spaces.

In an embodiment, the main body has a side wall along the longitudinal direction of the first space. The first space is configured to receive the first electrical wire between the side wall and the blade. The blade is configured to move from the first position to the second position. In the first position the blade is at a first distance from the side wall. In the second position the blade is at a second distance from the side wall. The first distance is larger than the second distance. For example, the first distance is larger than a thickness of the electrical wire. For example, the second distance is smaller than the thickness of the electrical wire.

In this embodiment, when the at least one blade is in the first position, the electrician can insert the first electrical wire into the first space in between the blade and the side wall. The blade is at a distance from the side wall that is more than the thickness of the electrical wire. When the first electrical wire is in the first space, the blade is moved to the second position. In the second position, the distance between the blade and the side wall is less than the thickness of the first electrical wire. This means that the blade has cut into the first electrical wire. The second distance is a distance at which the blade cuts into the metal core. The second distance should be small enough such that the blade cuts sufficiently into the metal core to create a cut that is large enough. The second distance should be large enough such that the blade does not cut too deep into the metal core. The second distance is for example determined by the size of the blade. In case the electrical wire is a wire with a cylindrical cross-section, the thickness of the electrical wire equals the diameter of the electrical wire. In case the electrical wire is a wire with a rectangular cross-section, the thickness equals the short side of the rectangular cross-section or the long side of the rectangular cross-section.

In an embodiment, the at least one blade comprises a first blade portion and a second blade portion arranged along the longitudinal direction of the first space. In the second position, the second distance is between the side wall and the second blade portion. In the second position, a third distance is between the side wall and the first blade portion. The third distance is larger than the second distance and smaller than the first distance.

In this embodiment, the first blade portion and the second blade portion are arranged along the longitudinal direction of the first space. For example, the first blade portion is a first cutting device configured to cut into the metal core, and the second blade portion is a second cutting device configured to cut into the metal core. A frame is configured to couple the first and second blade portions and to arrange the first and second blade portions along the longitudinal direction of the first space. In this example, the blade comprises the first and second blade portions and the frame. When the first electrical wire is inserted in the first space, the first electrical wire will first pass the first blade portion and then pass the second blade portion. When the blade is moved to the second position, both the first blade portion and the second blade portion are moved. In the second position, the first blade portion is at a third distance from the side wall of the space. For example, the cutting edge of the first blade portion is at the third distance from the side wall of the space. In the second position, the second blade portion is at the second distance from the side wall space. For example, the cutting edge of the second blade portion is at the second distance from the side wall of the space. The second blade portion is closer to the side wall than the first blade portion is to the side wall.

This embodiment has the advantage that the coupling device is able to couple with an electrical wire either with a large cross-section or a small cross-section. In case the electrical wire has a large cross-section, both the first blade portion and the second blade portion cut into the electrical wire. The third distance is set such that the first blade portion cuts into the metal core of the electrical wire. Because the third distance is larger than the second distance, the second blade portion cuts further into the electrical wire than the first blade portion. In an example, the second blade portion cuts completely through the metal core. This is not a problem, because the electrical wire is held by the first blade portion. In case the electrical has a small cross-section, the thickness of the electrical wire may be less than the third distance. In that case, the first blade portion does not cut into the electrical wire when the blade is in the second position. However, the second position is set such that the second blade portion cuts into the metal core of the electrical wire with the small cross-section, when the blade is in the second position. So the electrical wire is held by the second blade portion. In this embodiment, the coupling device is able to couple with electrical wires with a range of cross-sections and thicknesses. Preferably, the first blade portion is closer to an opening of the first space than the second blade portion is to the opening of the first space. The first space is configured to receive the first electrical wire via the opening.

In an embodiment, the second blade portion is longer than the first blade portion along the cutting direction.

In this embodiment, when the blade is moved to the second position, the distance between the second blade portion and the side wall is smaller than between the first blade portion and the side wall, because the second blade portion is longer than the first blade portion. Providing the first blade portion and the second blade portion with different lengths is a cost effective way to achieve the difference between the second distance and the third distance. Alternatively or in addition, the side wall has a first portion and a second portion. The first portion faces the first blade portion. The second portion faces the second blade portion. The second portion is at an offset relative to the first portion in a direction towards the blade. The second portion is closer to the blade than the first portion. As a result, when the first electrical wire is inserted in the first space, a part of the first electrical wire that is supported by the first portion is at a larger distance from the blade than a part of the electrical wire that is supported by the second portion. The first portion supports the electrical wire with enough distance to the first blade portion so an electrical wire with a large thickness is properly cut by the first blade portion. The second portion supports the electrical wire with enough distance to the second blade portion so an electrical wire with a small thickness is properly cut by the second blade portion.

In an embodiment the coupling device comprises a further blade. The main body forms a third space. The third space is configured to receive a third electrical wire. The further blade is movably coupled to the main body. The further blade is configured to move through the third space to create a cut in the third electrical wire in the third space.

In many situation, a single conduit houses multiple electrical wires. For example, the conduit houses a phase wire, a grounding wire, a switch wire and a neutral wire. It will save the electrician a lot of time if he or she pulls multiple electrical wires through the conduit simultaneously. By providing the main body with a plurality of spaces, each of the spaces can hold an electrical wire. The further blade is configured to cut into the metal core of at least an additional electrical wire. This way, multiple wires are coupled to the coupling device. By pulling the coupling device through the conduit, multiple wires are pulled through the conduit at the same time. The main body forms, for example, two or three or four or six or more than six spaces. An advantage of having a space for each of the plurality of electrical wires is that this enables the coupling device to properly couple with each electrical wire. By having a single electrical wire in a space, the position of the electrical wire in the space is defined by the shape of the space and/or the shape of the blade. As a result, the blade and the further blade can properly cut into the metal cores of the electrical wires. In comparison, by having multiple wires in a single space, there could be a lot of variation in how the wires are placed in the space. For example, the wires may be next to each other or one may be on top of the other. This variation in the position of the wires in a single space limits the accuracy with which the blade cuts into the metal core.

The plurality of spaces are configured to prevent an electrical wire from moving from one space to another space while the electrical wire is in the coupling device. The plurality of spaces are for example completely closed, except for an opening for inserting the electrical wire into the space. In an example, there are openings between the plurality of spaces, but the openings are too small for the electrical wire to pass through. For example, these openings are smaller than a diameter of the electrical wire.

An electrician may leave some spaces empty when using the coupling device. For example, the electrician uses a coupling device with four spaces to pull less than four wires simultaneously time through a conduit. For example, the electrician couples only one or two or three wires to the coupling device with four spaces.

In this embodiment, there is an additional blade, i.e., the further blade. The blade is arranged relative to the main body to move through the first space and the second space. The further blade is arranged relative to the main body to move through the third space. The blade cuts into the metal core of a different electrical wire than the further blade. This way, multiple electrical wire are coupled to the coupling device. This allows an electrician to pull multiple electrical wires through a conduit simultaneously. The further blade is, for example, exactly the same as the blade. Alternatively, the further blade has a different shape as the blade. For example, the further blade has a shape configured to properly cut into an electrical wire with a larger thickness than the blade. In another example, the further blade has a shape configured to properly cut into an electrical wire with a smaller thickness than the blade. The further blade has, for example, the first blade portion and the second blade portion as described above.

In an embodiment, the further blade is configured to move through the third space to cut into the third electrical wire perpendicular to a longitudinal direction of the third space. The further blade is configured to move in a different direction than the blade.

In this embodiment the blade and the further blade move in different directions. For example, in the case the elongated direction of the spaces is in a horizontal plane, the blade is movable along a vertical axis and cuts into the metal core when moving downward. The further blade is moveable along the vertical axis and cuts into the metal core when moving upward. The different directions are for example opposite to each other. In another example, the blade and the further blade move in directions at an angle of 45° or 90° or 120° to each other. In an embodiment, the coupling device comprises three blades. The blade are configured to move in directions at an angle of 120° relative to each other. In an embodiment, the coupling device comprises four blades. The four blade are configured to move in directions at an angle of 90° relative to each other. In an embodiment, the coupling device comprises six blades. The blade are configured to move in directions at an angle of 60° relative to each other.

In an embodiment, the main body forms a plurality of spaces. The at least one blade is movably coupled to the main body. Each of the plurality of spaces is configured to receive an electrical wire. The at least one blade is configured to move through at least two of the plurality of spaces to cut into the metal core of the electrical wire in each of the least two of the plurality of spaces. The at least one blade is, for example, a single blade.

In this embodiment, the blade is configured to cut into the metal cores of at least two electrical wires. Because each electrical wire is in its own space, each electrical wire is properly positioned relative to the blade, so the blade can properly cut into each metal core. The blade comprises, for example, at least two cutting edges. The at least two cutting edges are separated from each other. The at least two cutting edges are for example similar to each other. The at least two cutting edges are for example all concave cutting edges. The concave cutting edges are for example configured to align each electrical wire with a corresponding cutting edge. The plurality of spaces are for example aligned along a line perpendicular to the longitudinal direction of the electrical wire and perpendicular to the movement path of the blade. The line is for example a straight line or a curved line. The curved line describes, for example, a part of a circle.

In an embodiment, the connector comprises a hook or a loop configured to be connected to the pull line.

A hook or a loop provide a simple type of connector that can be connected to most types of fish tape. A hook and loop can be easily used to tie a pull line, such as a string, to the main body. Further, a hook and a loop are very well suited to connect to various couplers that are commonly available. The hook or loop can be connected to the fish tape via such a coupler.

In a further aspect of the invention, there is provided a method for pulling a plurality of electrical wires through a conduit, the method comprising:

inserting a first electrical wire in a first space of a main body;
inserting a second electrical wire in a second space of a main body;
moving one at least one blade in a cutting direction through the first space to create a cut in the first electrical wire;
moving one of at least one blade through the second space to create a cut in the second electrical wire;
fixating the at least one blade in the cuts;
pulling the electrical wires through the conduit by pulling the at least one blade.

According to this method, the electrical wires are pulled through the conduit by pulling the blade. The blade pulls the electrical wires via the cuts. By fixating the blade in the cuts with the fixating element, a large pull force can be applied to the electrical wires. The large pull force helps to pull the electrical wire through bends in the conduit without losing the electrical wires. By fixating the blade in the cut, it is prevented that the blade leaves the cuts while pulling the electrical wires.

In an embodiment, the method comprises:
creating the cuts in the first electrical wire and in the second electrical wire perpendicular to a longitudinal direction of the electrical wires.

In an embodiment, the method comprises:
cutting with the at least one the blade through an insulation layer of the first electrical wire,
cutting with the at least one blade into a metal core of the first electrical wire.

According to this embodiment, the blade cuts through the insulation layer of the electrical wire and cuts perpendicular to a longitudinal direction of the electrical wire into the metal core of the electrical wire. Then, the blade is pulled to pull the electrical wires through the conduit. This method has the advantage that after the blade makes the cut in the metal core, the blade is already in the correct position to be used to pull the electrical wire. Also, no insulation wire needs to be removed, because the blade is cuts through the insulation layer. As a result, this embodiment enables a quick method to pull multiple electrical wires through a conduit.

Electrical wires available at different shapes and sizes. The outer diameter of an electrical wire is for example selected to fit inside the inner diameter of a conduit. The shape of the cross-section of the electrical wire is for example round or square or rectangular or hexagonal. The cross-section of the metal core depends on the maximum electric current the electrical wire is designed for. The metal core has for example a cross-section of 1.5 mm2 for a maximum current of 10 A. The metal core has for example a cross-section of 2.5 mm2 for a maximum current of 16 A. The metal core has for example a cross-section of 6 mm2 for a maximum current of 32 A. The thickness of the insulation layer depends for example on the maximum intended current, the material in the insulation layer, or on safety regulations. It will be clear for the skilled person that the dimensions of the coupling device, such as the dimensions of the spaces and the dimensions of the blade, are to be chosen to match with the dimensions of the electrical wires that are intended to be coupled to the coupling device. The coupling device as described above may be dedicated for electrical wires within a range of cross-sections, but could be too small or too big for an electrical wire with a cross-section outside that range.

BRIEF DESCRIPTION OF THE DRAWINGS

The invention will be described in more detail below under reference to the figures, in which in a non-limiting manner exemplary embodiments of the invention will be shown. The figures show in.

DETAILED DESCRIPTION OF THE INVENTION

Figure 1:
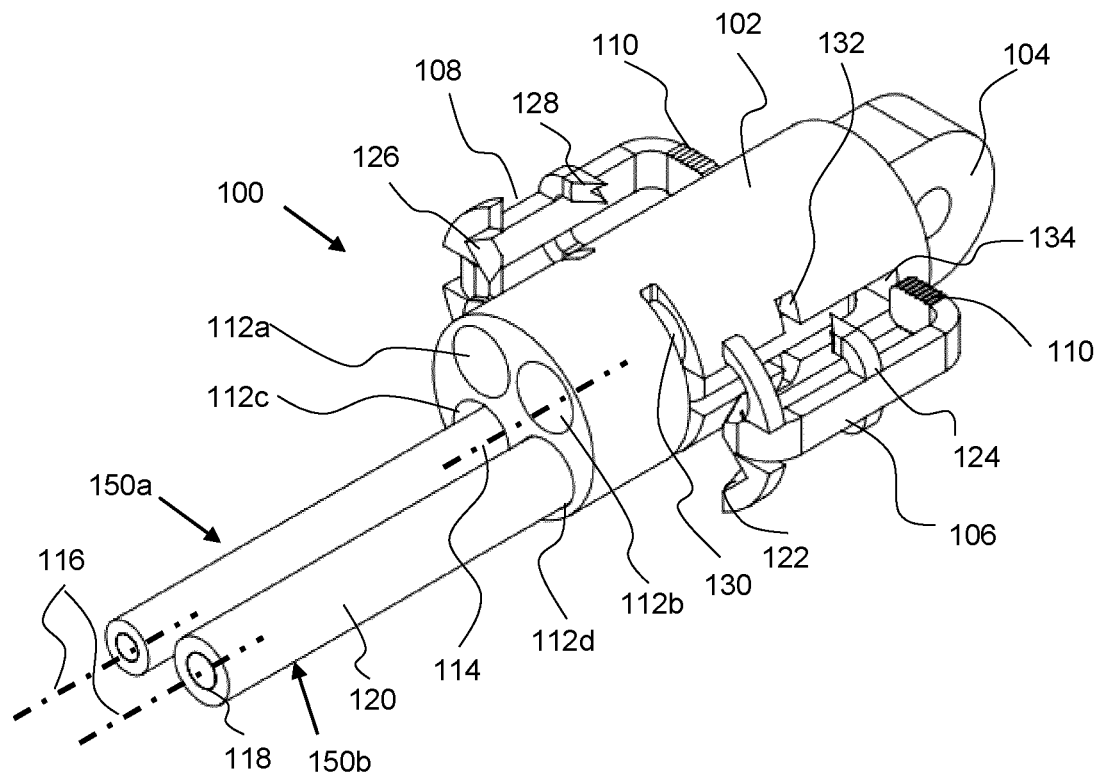
FIG. 1: a first embodiment of the invention in an exploded view.

FIG. 1 shows a first embodiment of the invention. FIG. 1 shows the coupling device 100 comprising a main body 102, a connector 104, a blade 106, a further blade 108, and a fixating element 110. FIG. 1 shows an exploded view in which the position of the blade 106 and the further blade 108 are depicted away from the main body 102 to properly show the features of the blade 106 and the further blade 108.

The connector 104 is for connecting the main body 102 to the pull line (not shown in the figure). The connector 104 has the shape of a loop to cooperate with the hook of a fish tape. The coupling device 100 can easily be connected to the hook of a fish tape by placing the hook of the fish tape in the loop of the connector 104.

The main body 102 forms four spaces 112a-d. Each of the four spaces 112a-d is configured to receive one electrical wire 150a, 150b. Each space 112a-d has a longitudinal direction 114. As shown in FIG. 1, only two of the four spaces 112c, 112d have received an electrical wire 150a, 150b, whereas the two other spaces 112a, 112b are empty and have not received an electrical wire.

Each of the electrical wires 150a, 150b extends along a longitudinal direction 116. Note that only a part of each electrical wire 150a, 150b is shown. In reality, the electrical wires 150a, 150b would extend further in the longitudinal direction 116. Although the longitudinal direction 116 is shown as a straight line, in practice, the electrical wires 150a, 150b may be bent. In that case, the longitudinal direction 116 has curves. Each of the electrical wire 150a, 150b has a metal core 118. Each of the electrical wires 150a, 150b has an insulation layer 120 that covers the metal core 118. The longitudinal direction of the main body 102 is parallel to the longitudinal direction 116.

The blade 106 has a first blade portion 122 and a second blade portion 124. Similarly, the further blade 108 has a further first blade portion 126 and a further second blade portion 128. In this embodiment, the blade 106 and the further blade 108 are identical.

The main body 102 has a first slit 130 and a second slit 132. The first slit 130 couples the first blade portion 122 to the main body 102. The first blade portion 122 is constrained in the first slit 130 in the longitudinal direction 114 of the spaces 112a-d by the side walls of the first slit 130. The first blade portion 122 is moveable in a direction perpendicular to the longitudinal direction 114 of the spaces 112a-d. Similarly, the second slit 132 couples the second blade portion 124 to the main body 102. The second blade portion 124 is constrained in the second slit 132 in the longitudinal direction 114 of the spaces 112a-d by the side walls of the second slit 132. The second blade portion 124 is moveable in a direction perpendicular to the longitudinal direction 114 of the spaces 112a-d. The main body 102 has further slits (not indicated in the figure) to couple the further first blade portion 126 and the further second blade portion 128 to the main body 102.

One fixating element 110 is connected to the first blade 106 and another fixating element 110 is connected to the second blade 108. The fixating element 110 has a serrated surface. The fixating element 110 is configured to be moved into an opening 134 of the main body 102. When the fixating element 110 is in the opening 134, the serrated surface is in contact with a surface of the main body 102 in the opening 134. The serrated surface is arranged such that the serrated surface is able to slide along the surface in the opening 134 when the fixating element 110 is moved into the main body 102. The serrated surface is arranged such that the serrated surface prevents movement of the fixating element 110 out of the body. Movement of the fixating element 110 out of the opening 134 is prevented because the serrated surface grips into the surface of the opening 134 when the fixating element 110 starts to move out of the opening 134.

Because the first blade portion 122 cuts the electrical wire 150b at the first slit 130, there is a cutting location is at the first slit. Because the second blade portion 124 cuts the electrical wire 150b at the second slit 130, there is another cutting location is at the first slit.

The fixating element 110 and the opening 134 are located at an offset from the cutting locations. The offset is in the direction of the longitudinal direction. The fixating element 110 and the opening 134 in the main body 102 are adapted to couple with each other.

Figure 2:
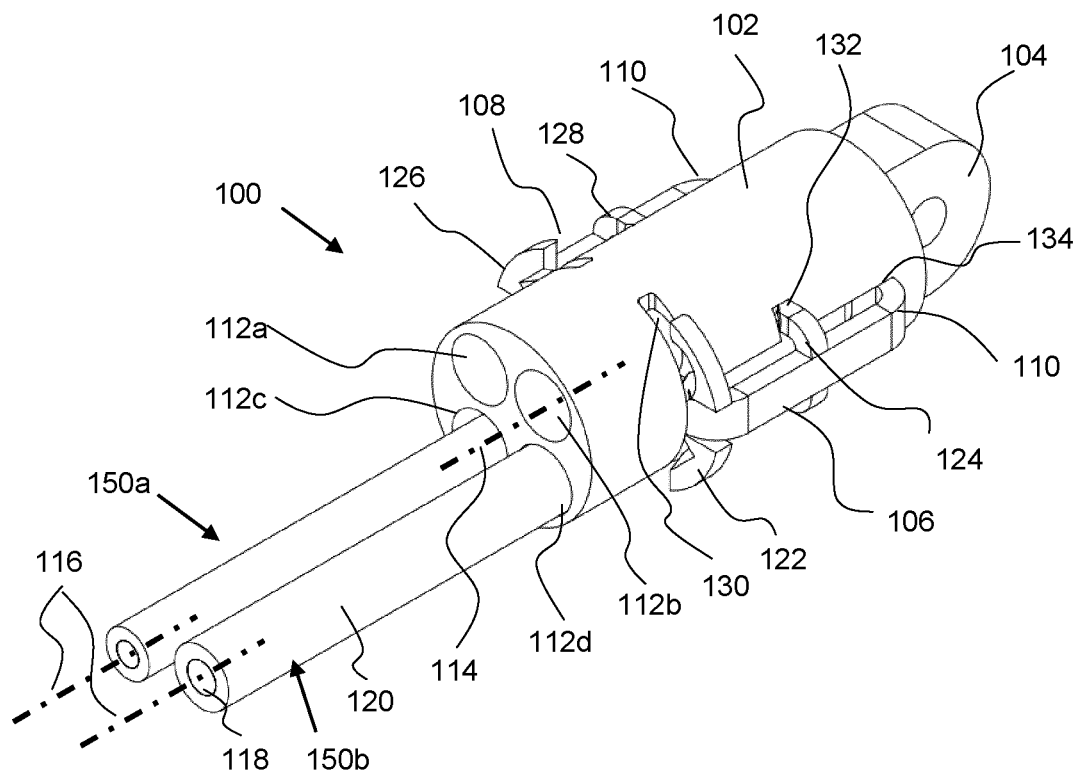
FIG. 2: the first embodiment of the invention with the blade in a first position.

FIG. 2 shows the first embodiment of the invention with the blade 106 in a first position. In the first position, the blade 106 is arranged outside the spaces 112b and 112d. In the first position, an electrician is able to insert electric wires into the spaces 112a-112d. As shown in FIG. 2, there is one electrical wire 150a in one space 112c, and another electrical wire 150b in another space 112d. Two spaces 112a and 112b are empty.

The electrical wire 150b is inserted into the space 112d such that the electrical wire 150b extends beyond the second slit 132. When the electrical wire 150b extend beyond the second slit 132, the second blade portion 124 is able to cut into the metal core 118 of the electrical wire 150b, even when an electrical wire has a small diameter or thickness. In case the electrical wire 150b has a large diameter or thickness, also the first blade portion 122 cuts into the metal core 118 of the electrical wire 150b.

Figure 3:
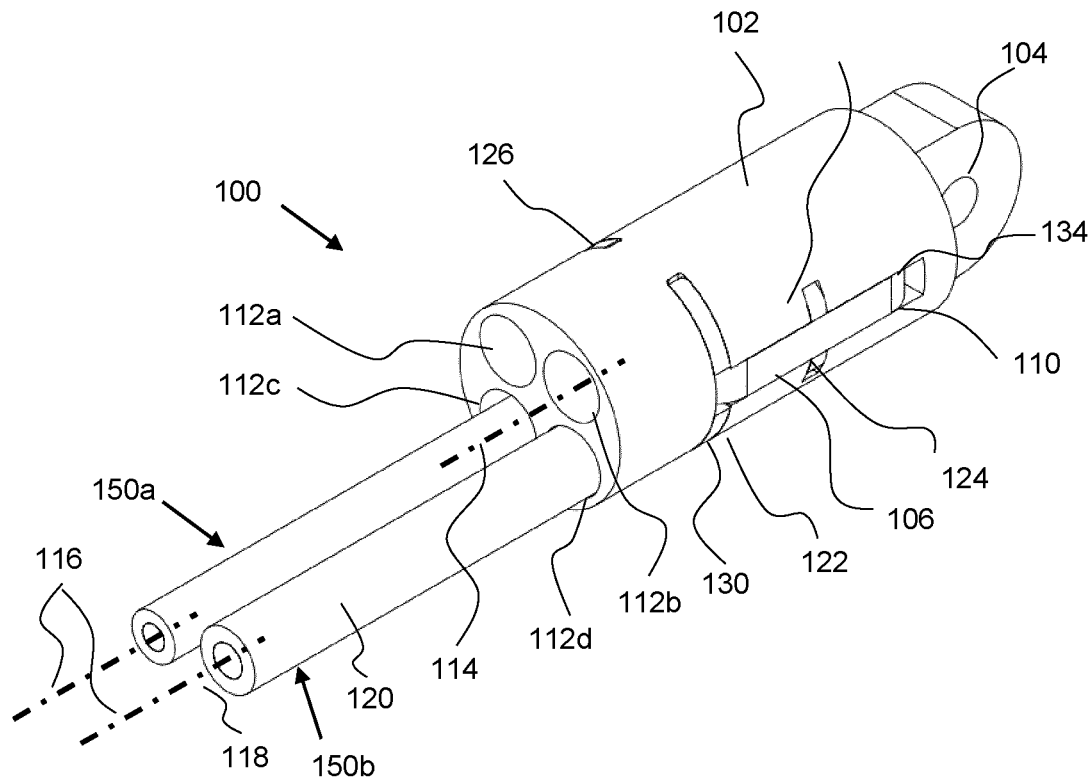
FIG. 3: the first embodiment of the invention with the blade in a second position.

FIG. 3 shows the first embodiment of the invention with the blade 106 in a second position. After the electrical wires had been inserted in the spaces while the blade 106 was in the first position, the blade 106 is moved to the second position. In the second position, the blade 106 is moved inward in the main body 102. While moving from the first position to the second position, the blade 106 cuts through the insulation layer 120 of the electrical wire 150b and into the metal core 118 of the electrical wire 150b. When the blade 106 is in the second position, the blade 106 has created a cut in the metal core 118 that is sufficiently deep to apply the required force to the metal core 118 to pull the electrical wire 150b through the conduit.

As is shown in FIG. 3, electrical wire 150b has a larger diameter than electrical wire 150a. When the blade 106 is in the second position, the first blade portion 122 creates the cut in the metal core 118 of the electrical wire 150b. When pulling the electrical wire through the conduit, the pulling force is applied to the metal core 118 via the first blade portion 122. The second blade portion 124 also creates a cut in the metal core 118. However, because the second blade portion 124 is longer than the first blade portion 122, the second blade portion 124 cuts deeper in the metal core 118 than the first blade portion 122. The second blade portion 124 may cut too deep in the metal core 118, such that the metal core 118 would not be able to resist the pull force if the pull force would be applied to the metal core 118 by the second blade portion 124. However, no pull force or only a small amount of the pull force is transferred from the second blade portion 124 to the metal core 118, because the majority or all of the pulling force is transferred from the first blade portion 122 to the metal core 118. When the further blade 108 is in the second position, the further first blade portion 126 does not create a proper cut in the metal core 118 of the electrical wire 150a, because the diameter of the electrical wire 150a is too small for the further first blade portion 126 to reach the metal core 118. The further first blade portion 126 may not contact the electrical wire 150a at all, may cut only into the insulation layer 120 of the electrical wire 150a or may create only a superficial cut in the metal core 118 that is not sufficient to apply the pulling force to. So when pulling the electrical wire through the conduit, no or almost no pulling force is applied to the metal core 118 of the electrical wire 150a via the further first blade portion 126. The second blade portion 124 creates a proper cut in the metal core 118 of the electrical wire 150a. Because the second blade portion 124 is longer than the first blade portion, the second blade portion 124 extends deeper into the space 112c in the second position of the further blade 108 to reach the metal core 118 of the electrical wire 150a. So the majority or all of the pulling force is transferred from the further second blade portion 128 to the metal core 118 of the electrical wire 150a.

The blade 106 and the further blade 108 are prevented from moving back to the first position because of the fixating elements 110. The serrated surfaces of the fixating elements 110 block movement of the fixating elements 110 from the second position back to the first position. As a result, the blade 106 and the further blade 108 remain in the second position while the coupling device 100 is used to pull the electrical wires through the conduit.

Figure 4:
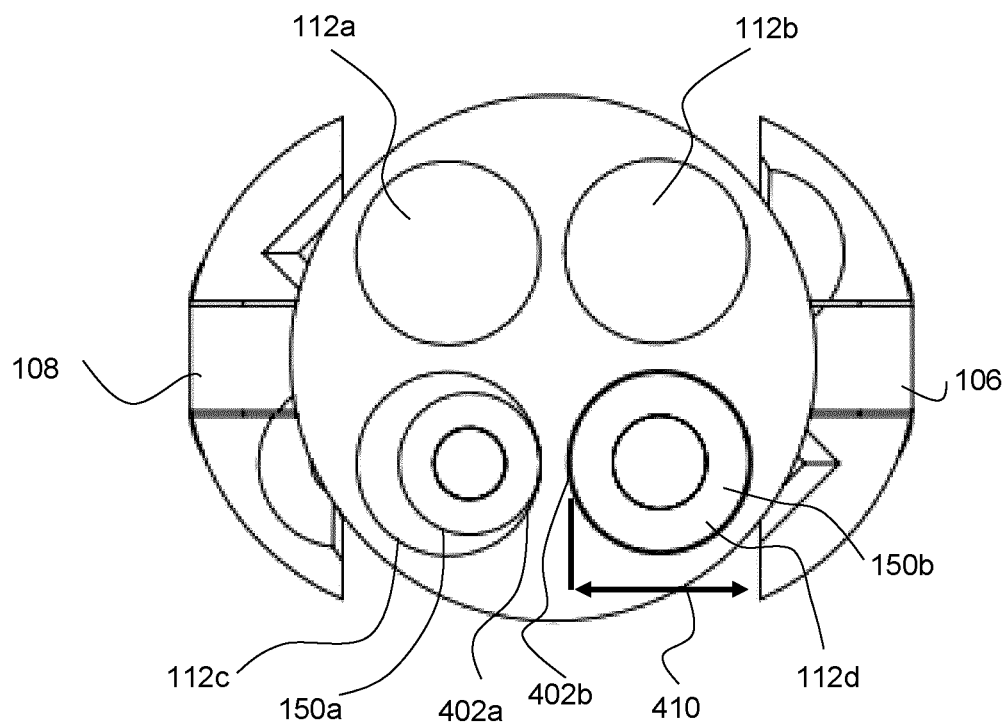
FIG. 4: the first embodiment in a front view with the blade in the first position.

FIG. 4 shows a front view of the first embodiment. The blade 106 and the further blade 108 are in the first position. In the first position, the blade 106 and the further blade 108 are outside the spaces 112a-d. When the blade 106 and the further blade 108 are outside the spaces 112a-d, the electrical wires 150a, 150b can be inserted in the spaces 112c, 112d. Electrical wire 150b is arranged in the space 112d between the blade 106 and a side wall 402b of the space 112d. Electrical wire 150a is arranged in the space 112c between the further blade 108 and a side wall 402a of the space 112c. The side wall 402a and the side wall 402b extends along the longitudinal direction of the spaces 112a-d. In the first position, there is a first distance 410 between the cutting edge of the first blade portion 122 and the side wall 402b of the space 112d. The first distance 410 is larger than the diameter of the electrical wire 150b. Also, the distance between the cutting edge of the second blade portion 124 and the side wall 402b of the space 112d is larger than the diameter of the electrical wire 112d.

Figure 5:
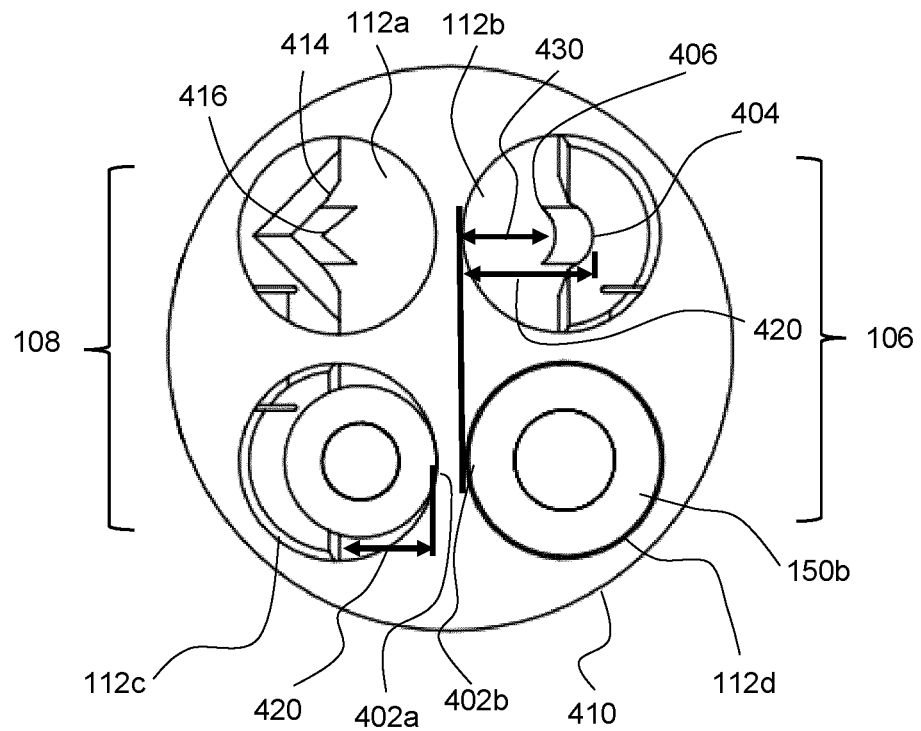
FIG. 5: the first embodiment in the front view with the blade in the second position.

FIG. 5 shows the front view of the first embodiment when the blade 106 and the further blade 108 are in the second position. In the second position, the blade 106 and the further blade 108 have been moved inward into the main body 102 to cut into the electrical wires 150a, 150b. In the second position, there is a second distance 420 between the cutting edge of the second blade portion 124 and the side wall 402a of the space 112c. The second distance 420 is smaller than the diameter of the electrical wire 150a. The second distance 420 is small enough to create the cut in the metal core 118 of an electrical wire with a small diameter. In the second position, there is a third distance 430 between the cutting edge of the first blade portion 122 and the side wall 402b of the space. The third distance 430 is smaller than the diameter of the electrical wire 150b. The third distance 430 is small enough to create the cut in the metal core 118 of an electrical wire with a large diameter. The third distance 430 is larger than the second distance 420 to prevent the first blade portion 122 from cutting too deep into the metal core 118 of an electrical wire with a large diameter.

FIG. 5 shows various shapes of the cutting edges of the blade 106 and the further blade 108. The cutting edge of the first blade portion 122 is a large curved cutting edge 404. The large curved cutting edge 404 is concave. The concave shape of the large curved cutting edge 404 is configured to cut less in the center of the metal core 118, but more on the outside of the metal core 118. The cutting edge of the second blade portion 124 is a small curved cutting edge 406. The small curved cutting edge 406 is concave. The concave shape of the small curved cutting edge 406 is configured to cut less in the center of the metal core 118, but more on the outside of the metal core 118.

The cutting edge of the further first blade portion 126 is a large triangular cutting edge 414. The large triangular cutting edge 414 is concave. The concave shape of the large triangular cutting edge 414 is configured to cut less in the center of the metal core 118, but more on the outside of the metal core 118. The cutting edge of the second blade portion 124 is a small triangular cutting edge 416. The small triangular cutting edge 416 is concave. The concave shape of the small triangular cutting edge 416 is configured to cut less in the center of the metal core 118, but more on the outside of the metal core 118.

The first blade portion 122 has two cutting edges to cut into both the space 112b and space 112d. The second blade portion 124 has two cutting edge to cut into both the space 112b and space 112d. The further first blade portion 126 has two cutting edges to cut into both the space 112a and space 112c. The further second blade portion 128 has two cutting edge to cut into both the space 112a and space 112c.

Figure 6:
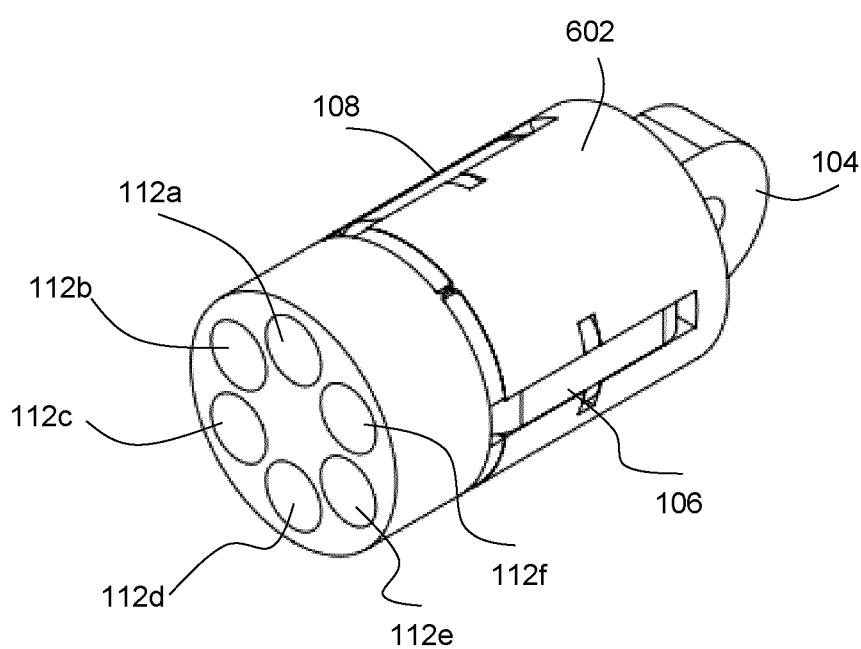
FIG. 6: a second embodiment of the invention.
Figure 7:
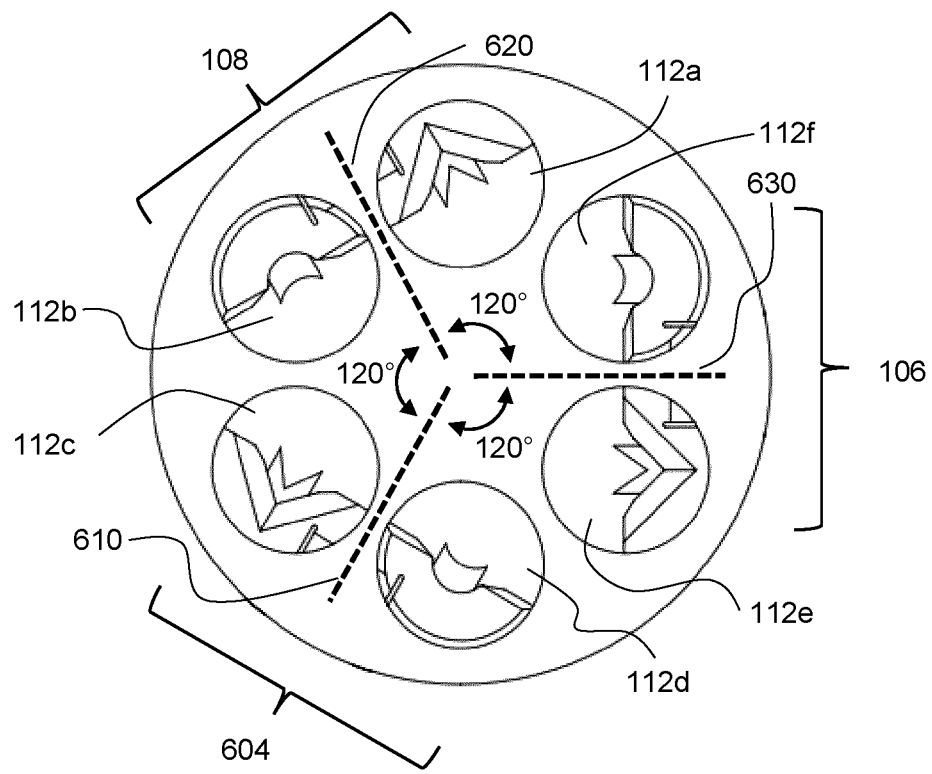
FIG. 7: the second embodiment in a front view.

FIG. 6 shows a second embodiment of the invention. The main body 602 is the same as the main body 102 from the first embodiment, except for the following. The main body 602 has six spaces 112a-112f. Each of the six spaces 112a-112f is configured to receive an electrical wire, so the coupling device 100 is configured to couple with six electrical wire simultaneously. This allows an electrician to pull six electrical wires through a conduit at once. The coupling device 100 is provided with three blades, i.e., the blade 106, the further blade 108 and a third blade 604. The cutting edges of the third blade 604 are shown in FIG. 7. The dashed lines 610, 620 and 630 in FIG. 7 indicate the direction of movement of each of the blades. The direction of movement is in a plane perpendicular to the longitudinal direction 114 of the spaces 112a-112f, which is parallel to the longitudinal direction 116 of the electrical wires in the spaces 112a-112f. The angle between the direction of movement of the blades is 120°, to evenly distribute the blades along a circumference of the main body 602.

Figure 8:
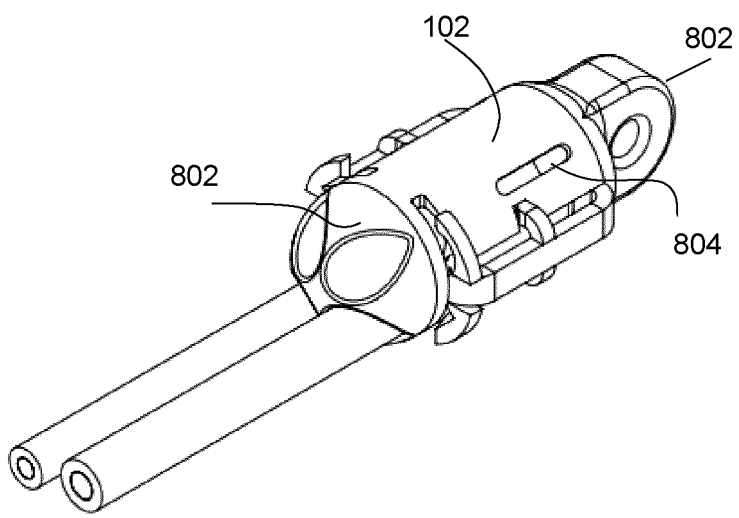
FIG. 8: a third embodiment of the invention.

FIG. 8 shows a third embodiment of the coupling device 100. The third embodiment is the same as the first embodiment, except for what is stated below. The main body 102 has a rounded edges to improve the movement of the main body 102 through the conduit, when the main body 102 is pulled through a bend in the conduit. The main body 102 is further provided with an opening 804. The opening 804 makes the inside of the spaces 112a-d visible. After inserting an electrical wire into one of the spaces 112a-d, a visual inspection can be done through the opening 804 to ensure that the electrical wire 150a, 150b has been inserted far enough into the space 112a-d.

Figure 9:
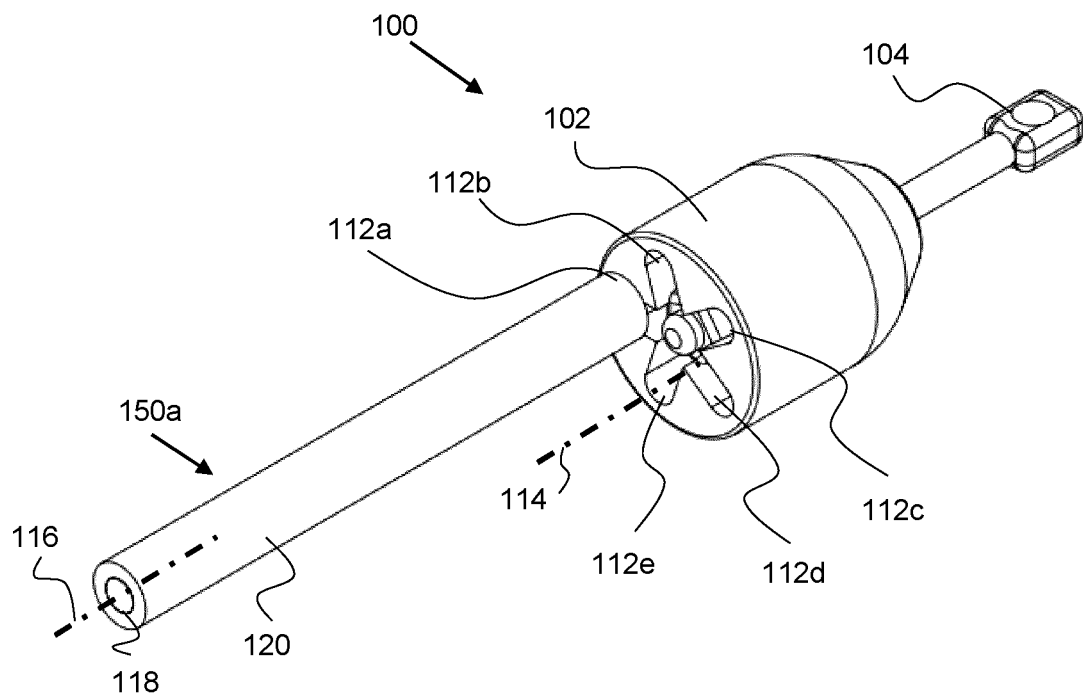
FIGS. 9-11: a fourth embodiment of the invention.
Figure 10:
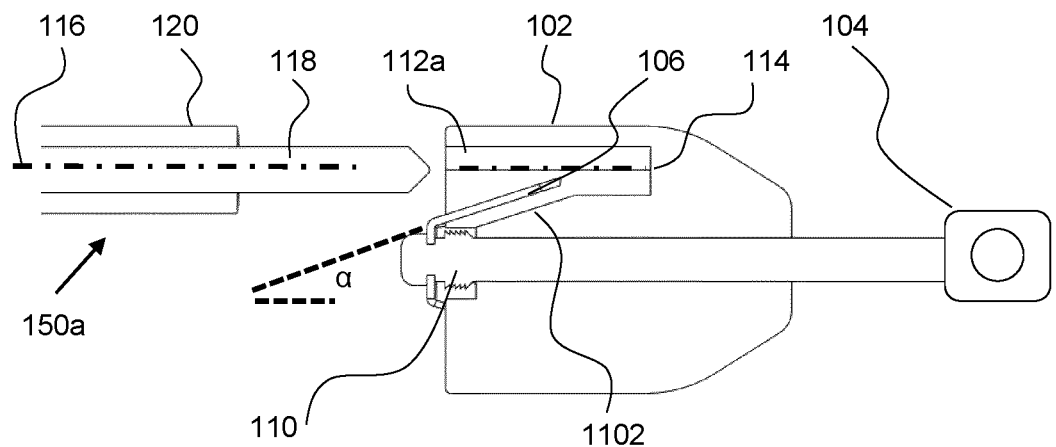
Figure 11:
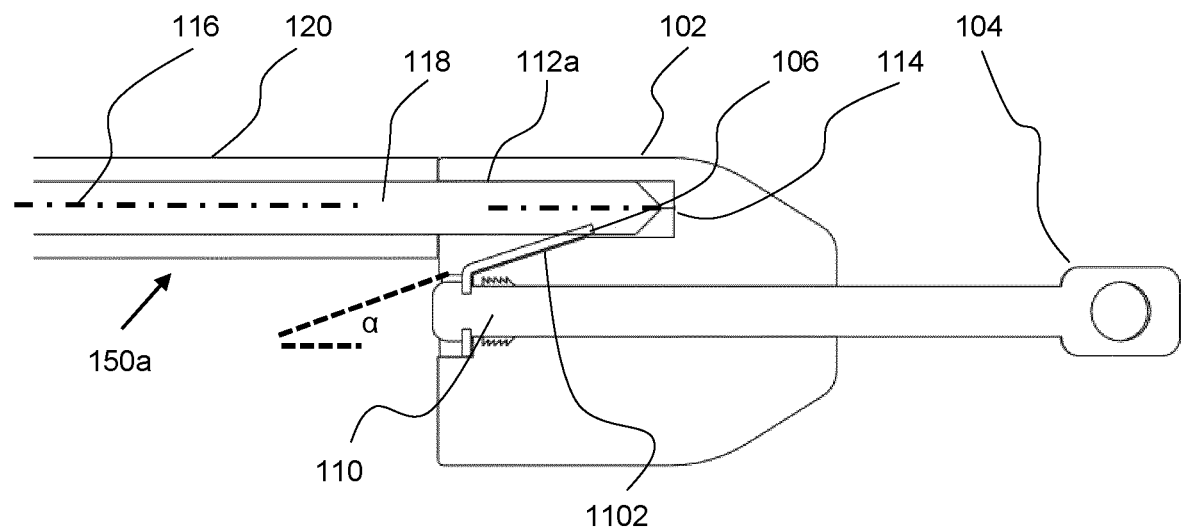

FIG. 9 shows a fourth embodiment of the coupling device 100 according to the invention. The fourth embodiment is the same as the embodiments as described above, except for the following. The fourth embodiment shows the main body 102 which forms five spaces 112a-e. Each of the five spaces 112a-e is configured to receive an electrical wire 150a. FIG. 9 shows only one electrical wire 150a inserted into one 112a of the five spaces 112a-e. As shown in the cross-section of the fourth embodiment in FIG. 10, the connector 104, the fixating element 110 and the blade 106 form a single body that is moveable relative to the main body 102. The blade 106 is arranged at an acute angle α with the longitudinal direction 114 of the space. The cutting edge of the blade 106 is arranged in the space 112a before the electrical wire 150a is inserted into the space 112a. When the electrical wire 150a is inserted in the space 112a, the acute angle α of the blade 106 allows the electrical wire 150a to push the blade 106 out of the way, i.e., downward in FIG. 10, to allow the electrical wire 150a into the space 112a. The electrical wire 150a pushes the blade 106 out of the way, by bending the blade 106. When the electrical wire 150a pushes the blade 106 out of the way, the blade 106 is still at an acute angle α with the longitudinal direction 114 of the space and thus at an acute angle with the longitudinal direction 116 of the electrical wire 150a. The electrical wire 150a is fixed in the space 112a by pulling the connector 104, as is shown in FIG. 11. By pulling the connector 104, the connector 104 moves to the right of the figure relative to the main body 102. So by pulling the connector 104, the connector 104 moves relative to the electrical wire 150a in the space 112a. Because the connector 104 is coupled to the blade 106, the blade 106 cuts into the electrical wire 150a. The blade 106 cuts at the acute angle α between the blade 106 and the electrical wire 150a. The connector 106 is able to move relative to the main body 102 until an endstop 1102 prevents the blade 106 to move any further relative to the main body 102. In this embodiment, the endstop 1102 is formed by a slanted surface. The slanted surface prevents the blade 106 to move in a direction perpendicular to the cutting direction of the blade 106. By pulling the connector 104, the fixating element 110 moves relative to the main body 102, because the fixating element 110 is coupled to the connector 104. The fixating element 110 is pulled by the connector 104 into an opening in the main body 102. The opening is a tight opening which causes a deformation of the opening and/or the fixating element 110, when the fixating element 110 is pulled into the opening. The fixating element 110 has a serrated surface that contacts an inner surface of the opening. Because of the tight opening, the serrated surface bites or sticks into the inner surface of the opening. The serrated surface is orientated to allow the fixating element 110 to move relative to the main body 102 while the connector 104 is pulled, whereas the serrated surface is orientated to prevent the fixating element 110 to move relative to the main body 102 in the opposite direction, i.e., to the left in FIG. 11. Because the blade 106 is held in the cut in the electrical wire 150a by the fixating element 110, the electrical wire 150a remains in the space 112a while pulling the coupling device 100 holding the electrical wire 150a through a conduit. In FIGS. 9-11, the end of the electrical wire 150a is shown with the insulation layer 120 removed. Alternatively, the end of the electrical wire 150a is provided with the insulation layer 120 when the end of the electrical wire 150a is inserted in the space 112a.

Figure 12:
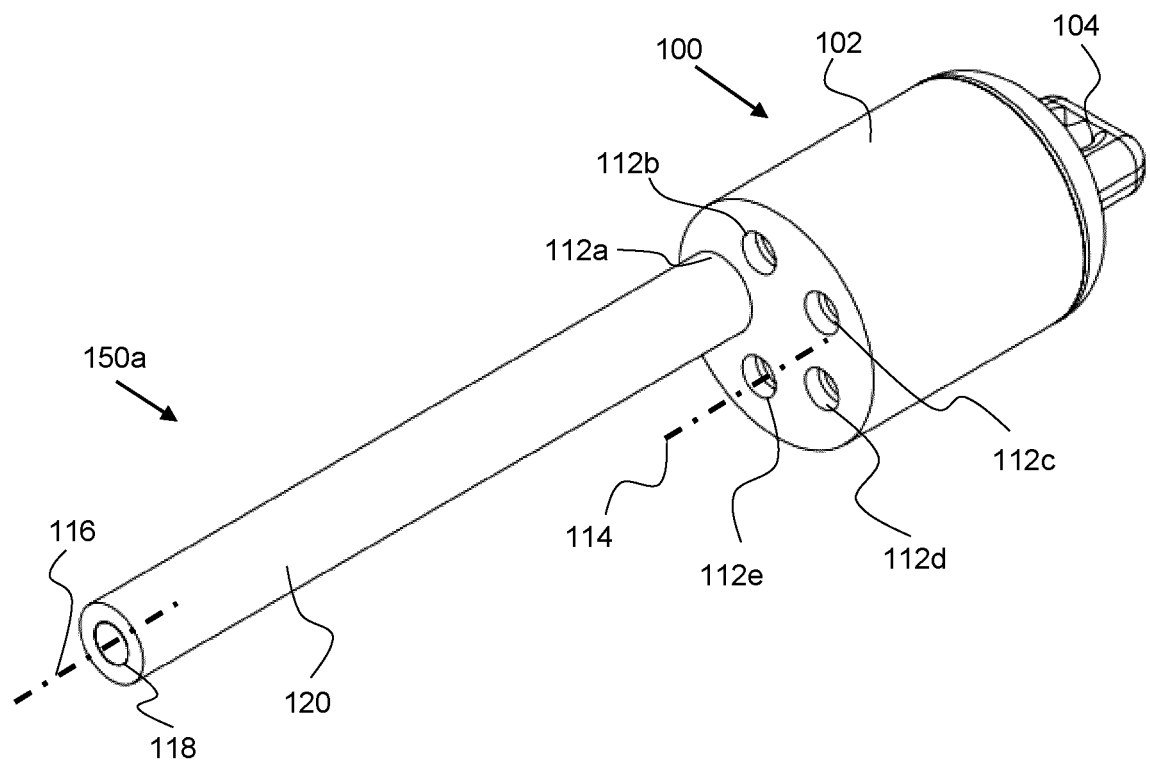
FIGS. 12-14: a fifth embodiment of the invention.

FIG. 12 shows a fifth embodiment according to the invention. The fifth embodiment is the same as the embodiments as described above, except for the following. The fifth embodiment shows the main body 102 which forms five spaces 112a-e. Each of the five spaces 112a-e is configured to receive an electrical wire. FIG. 12 shows only one electrical wire 150a inserted into one 112a of the five spaces 112a-e. As shown in the cross-section of the fifth embodiment in FIG. 13, blade 106 is fixedly coupled to the main body 102. The fixating element 110 is separate from the main body 102 and from the blade 106. The fixating element 110 is moveable relative to the main body 102. The connector 104 is coupled to the main body 102.

The blade 106 is arranged at an acute angle with the longitudinal direction 114 of the space 112a. The cutting edge of the blade 106 is arranged in the space 112a before the electrical wire 150a is inserted into the space 112a. When the electrical wire 150a is inserted in the space 112a, the acute angle of the blade 106 allows the electrical wire 150a to push the blade 106 out of the way, i.e., bending the blade 106 upward in FIG. 13, to allow the electrical wire 150a into the space 112a. When the electrical wire 150a pushes the blade 106 out of the way, the blade 106 is still at an acute angle with the longitudinal direction 114 of the space and thus at an acute angle with the longitudinal direction 116 of the electrical wire 150a.

Figure 14:
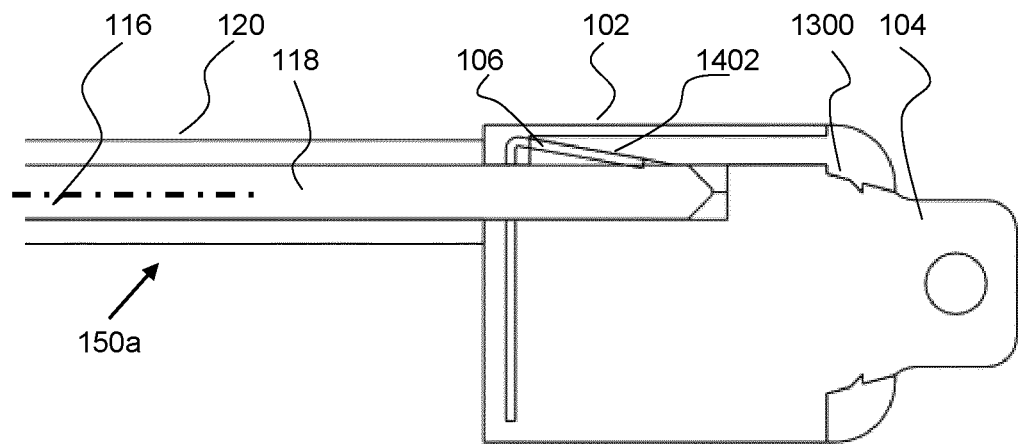

The electrical wire 150a is fixed in the space 112a by inserting the fixating element 110 into the main body 102, as is shown in FIG. 14. The fixating element 110 has a wedge 1402 which has the same or almost the same angle as the acute angle α of the blade. By inserting the fixating element 110 into the main body 102, the wedge 1402 moves over the blade 106. By moving over the blade 106, the wedge 1402 encloses one side of the blade 106. That one side is a side surface of the blade 106 that faces away from the electrical wire 150a. By enclosing that side surface of the blade 106, the position of the blade 106 is fixed, preventing the blade 106 from moving. The position of the blade is fixed at the cutting edge of the blade 106 by the cut in the electrical wire. The blade 106 is unable to bend away from the electrical wire 150a, because the wedge 1402 of the fixating element 110 prevents the blade 106 from bending away from the electrical wire 150a. The blade 106 is unable bend towards the electrical wire 150a, because the electrical wire 150a prevents the blade 106 from bending towards from the electrical wire 150a. Because the blade 106 is fixedly connected to the main body 102, the blade 106 is not able to move out of the cut. So by inserting the fixating element 110 into the main body 102, the blade 106 is fixed into the cut in the electrical wire 150a. The fixating element 110 is configured to maintain the correct position relative to the main body 102, for example, by press-fitting the fixating element 110 into the main body 102 or by providing a fastener to lock the fixating element 110 relative to the main body 102 or by providing a serrated surface that prevents the movement of the fixating element 110 relative to the main body 102 in a desired direction. In an example, the pull line that is inserted through a loop of the connector 104 prevents the fixating element 110 from moving out of the main body 102.

Because the blade 106 cuts the electrical wire 150a in the first space 112a, there is a cutting location in the first space 112a. The fixating element 110 and the main body 102 are coupled to each other at a coupling location 1300. At the coupling location 1300, the fixating element 110 and the main body 102 are press-fitted together. The coupling location 1300 is located at an offset from the cutting location in the first space 112a. The offset is in the direction of the longitudinal direction of the main body.

Figure 13:
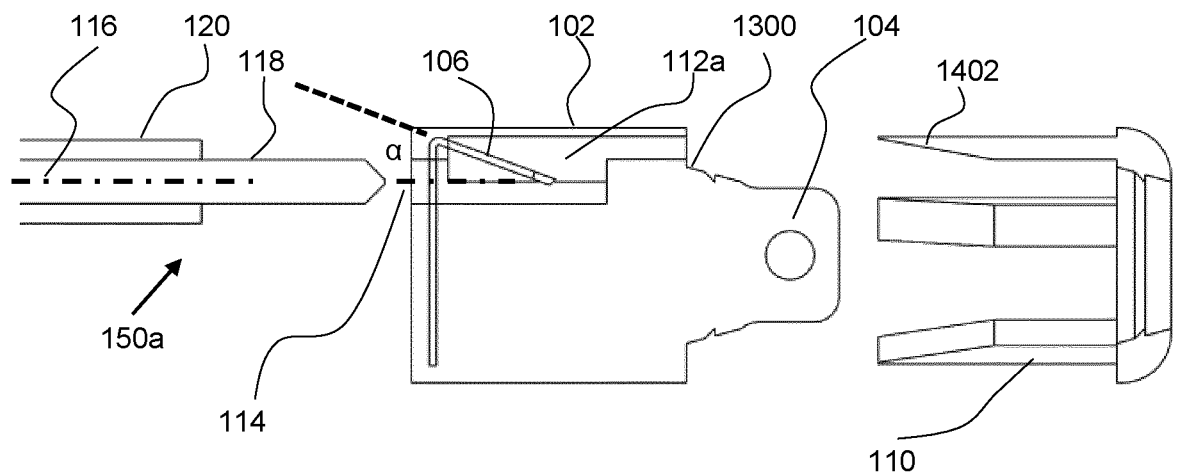

Because the blade 106 is held in the cut in the electrical wire 150a by the fixating element, the electrical wire 150a remains in the space 112a while pulling the coupling device 100 coupled to the electrical wire 150a through a conduit. In FIGS. 12-14, the end of the electrical wire 150a is shown with the insulation layer 120 removed. Alternatively, the end of the electrical wire 150a is provided with the insulation layer 120 when the end of the electrical wire 150a is inserted in the space 112a.

As required, this document describes detailed embodiments of the present invention.

Furthermore, the various terms used in the description should not be interpreted as restrictive but rather as a comprehensive explanation of the invention.

The word "a" used herein means one or more than one, unless specified otherwise. The phrase "a plurality of" means two or more than two. The words "comprising" and "having" are constitute open language and do not exclude the presence of more elements.

The invention claimed is:

1. A coupling device for coupling a plurality of electrical wires to a pull line, wherein the coupling device comprises:
   a main body having a longitudinal length and a lateral extent;
   a connector for connecting the main body to the pull line;
   at least one blade coupled to the main body; and
   a fixating element, wherein the fixating element is laterally movable relative to the lateral extent of the main body within an opening of the main body,
   wherein the main body forms a first space and a second space;
   wherein the first space is configured to receive a first electrical wire,
   wherein the second space is configured to receive a second electrical wire,
   wherein the first space and the second space are laterally separated from each other by an inner wall portion of the main body,
   wherein one of the at least one blade is moveable through the first space in a cutting direction to create a cut in the first electrical wire,
   wherein one of the at least one blade is moveable through the second space to create a cut in the second electrical wire; and
   wherein the fixating element is configured to fixate the at least one blade in the cuts.

2. The coupling device according to claim 1, wherein the at least one blade is moveably coupled to the main body, and wherein the at least one blade is configured to create the cut by moving through the first space and the second space.

3. The coupling device according to claim 1, wherein the cutting direction is perpendicular to a longitudinal direction of the first space.

4. The coupling device according to claim 1, wherein the first space is configured to arrange a longitudinal direction of the first electrical wire parallel to the longitudinal direction of the first space.

5. The coupling device according to claim 4, wherein the at least one blade is moveably coupled to the main body, wherein the at least one blade is configured to move from a first position to a second position,
   wherein in the first position, the at least one blade is arranged outside the first space and the second space to allow the first space to receive the first electrical wire and to allow the second space to receive the second electrical wire, and
   wherein in the second position, the fixating element is arranged to fixate the at least one blade in the cuts to hold the first electrical wire in the first space and the second electrical wire in the second space.

6. The coupling device according to claim 5, wherein the main body has a side wall along the longitudinal direction of the first space,
   wherein the first space is configured to receive the first electrical wire between the side wall and one of the at least one blade,
   wherein in the first position the blade is at a first distance from the side wall, and
   wherein in the second position the blade is at a second distance from the side wall,
   wherein the first distance is larger than the second distance.

7. The coupling device according to claim 6, wherein the one of the at least one blade comprises a first blade portion and a second blade portion arranged along the longitudinal direction of the first space,
   wherein, in the second position, the second distance is between the side wall the second blade portion,
   wherein, in the second position, a third distance is between the side wall and the first blade portion, and
   wherein the third distance is larger than the second distance and smaller than the first distance.

8. The coupling device according to claim 7, wherein the second blade portion is longer than the first blade portion along the cutting direction.

9. The coupling device according to claim 1, comprising a further blade,
   wherein the main body forms a third space,
   wherein the third space is configured to receive a third electrical wire,
   wherein the further blade is movably coupled to the main body, and
   wherein the further blade is configured to move through the third space to create a cut in the third electrical wire in the third space.

10. The coupling device according to claim 9, wherein the further blade is configured to move through the third space to cut into the third electrical wire perpendicular to a longitudinal direction of the third space, and
    wherein the further blade is configured to move in a different direction than the at least one blade.

11. The coupling device according to claim 1, wherein the connector and the fixating element are coupled to each other.

12. A method for pulling a plurality of electrical wires through a conduit by a coupling device according to claim 1, the method comprising:
    inserting a first electrical wire in a first space of a main body;

inserting a second electrical wire in a second space of a main body;
moving one of at least one blade in a cutting direction through the first space to create a cut in the first electrical wire;
moving one of at least one blade through the second space to create a cut in the second electrical wire;
fixating the at least one blade in the cuts; and
pulling the electrical wires through the conduit by pulling the at least one blade.

13. The method according to claim 12, further comprising:
creating the cuts in the first electrical wire and in the second electrical wire perpendicular to a longitudinal direction of the electrical wires.

14. The method according to claim 12, further comprising:
cutting with the at least one the blade through an insulation layer of the first electrical wire, and
cutting with the at least one blade into a metal core of the first electrical wire.

\* \* \* \* \*